(12) United States Patent
Morris et al.

(10) Patent No.: US 6,466,372 B1
(45) Date of Patent: Oct. 15, 2002

(54) SYSTEMS FOR PROJECTING IMAGES FROM DIFFRACTIVE PHASE PLATES

(76) Inventors: G. Michael Morris, 67 Nettlecreek Rd., Fairport, NY (US) 14450; Joachim Bunkenburg, 113 Lynaugh Rd., Victor, NY (US) 14564

( * ) Notice: Subject to any disclaimer, the term of this patent is extended or adjusted under 35 U.S.C. 154(b) by 0 days.

(21) Appl. No.: 08/857,815

(22) Filed: May 16, 1997

(51) Int. Cl.⁷ ............... G02B 5/18; G03H 1/08
(52) U.S. Cl. ............... 359/567; 359/9; 359/11; 359/26; 359/29; 359/33; 359/558
(58) Field of Search ................. 359/9, 11, 26, 359/29, 33, 1, 558, 566, 567

(56) References Cited

U.S. PATENT DOCUMENTS

| | | |
|---|---|---|
| 3,625,584 A | 12/1971 | St. John |
| 3,632,181 A | 1/1972 | Lee |
| 3,632,869 A * | 1/1972 | Bartolini et al. ............ 359/26 |
| 3,746,783 A * | 7/1973 | Gerritsen et al. ........... 359/26 |
| 3,884,546 A * | 5/1975 | Chu ......................... 359/9 |
| 3,936,138 A * | 2/1976 | Noguchi .................... 359/33 |
| 4,007,481 A | 2/1977 | St. John |
| 4,037,919 A * | 7/1977 | Takeda et al. .............. 359/9 |
| 4,337,992 A | 7/1982 | Johnson |
| 4,595,252 A | 6/1986 | Lorimer |
| 4,846,552 A | 7/1989 | Veldekamp et al. |
| 5,024,508 A * | 6/1991 | Horner ..................... 359/561 |
| 5,148,316 A * | 9/1992 | Horner et al. ............. 359/561 |
| 5,148,319 A | 9/1992 | Gratrix et al. |
| 5,155,605 A | 10/1992 | Wreede et al. |
| 5,172,251 A | 12/1992 | Benton et al. |
| 5,191,449 A | 3/1993 | Newswanger |
| 5,341,229 A | 8/1994 | Rowan |
| 5,418,632 A | 5/1995 | Anderson |
| 5,546,198 A | 8/1996 | van der Gracht et al. |
| 5,670,280 A * | 9/1997 | Lawandy .................... 430/5 |
| 5,718,496 A * | 2/1998 | Feldman et al. ............ 353/42 |
| 5,724,447 A * | 3/1998 | Fukushima ................. 382/211 |

OTHER PUBLICATIONS

Blough et al., "High–Efficiency Replicated Diffractive Optics", Proc. SPIE 2600–15 (1995).
Faklis et al., "Continuous phase diffractive optics using laser pattern generation", SPIE Holography 7/93 (Jul. 1993).
Gale, et al., "Fabrication of continuous–relief microoptical elements . . . ", pp. 3556–3566 Opt. Eng. 11/94, vol. 33, No. 11 Nov. 1994.
Yoshikawa et al., "Phase optimization of a kinoform by . . . ", Applied Optics, 2/94 pp. 863–868, vol. 33 No. 5, Feb. 1994.
Goodman, J.W., *Introduction to Fourier Optics*, pp. 276–277 (McGraw–Hill, New York, 1968).
S hvartsman, "Replication of Diffractive Optics", SPIE pp. 156–186 (1993) CR–49.

(List continued on next page.)

*Primary Examiner*—Jon Henry

(57) ABSTRACT

A system for projecting images is provided having a group of diffractive phase plates each encoded with different image information which have phase shifts aligned to reconstruct visible images in a Fraunhofer diffraction region. The plates are arranged along a path, and may represent successive frames of animation. A light source illuminates the plates and provides, when multiple plates are illuminated, a composite image representing image information encoded in such multiple plates. This composite image is a coincident superposition of reconstructed images from the multiple plates. A mechanism is provided for moving the plates along their path such that images projected from the system in the Fraunhofer diffraction region represent the composite image from successively different illuminated multiple plates or the reconstructed image from a single plate. Both monochromatic and multi-color channel phase plates may be used in the system.

34 Claims, 7 Drawing Sheets

OTHER PUBLICATIONS

Stark et al. "Design of phase gratings by generalized . . . ", J. Optic Soc. Am A, May 10, 1996 pp. 566–571.

Dupparré et al., "Investigation of computer–generated diffractive beam . . . ", Applied Optics, pp. 2484–2497, May 10, 1996, vol. 34, No. 14.

Lee, "Computer–generated Holograms: Techniques and Applications", in Wolf, *Progress in Optics*, vol. XVI, (North–Holland) 1978.

Weissbach et al., "Coding and quantizaiton . . . " SPIE vol. 1136 Holographic Optics II, pp. 226–227 (1989).

Wyrowski, "Coding and quantiation techniques . . . ", SPIE vol. 1136 Holographic Optics II, pp. 215–219 (1989).

* cited by examiner

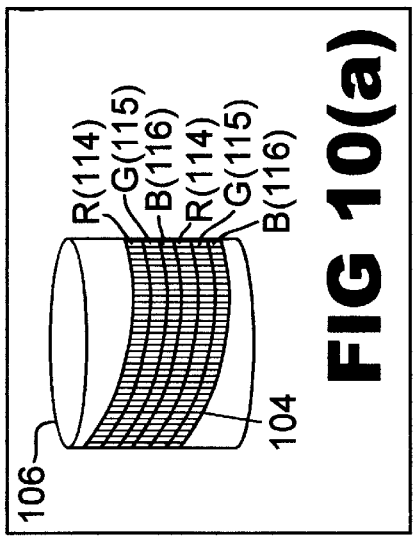
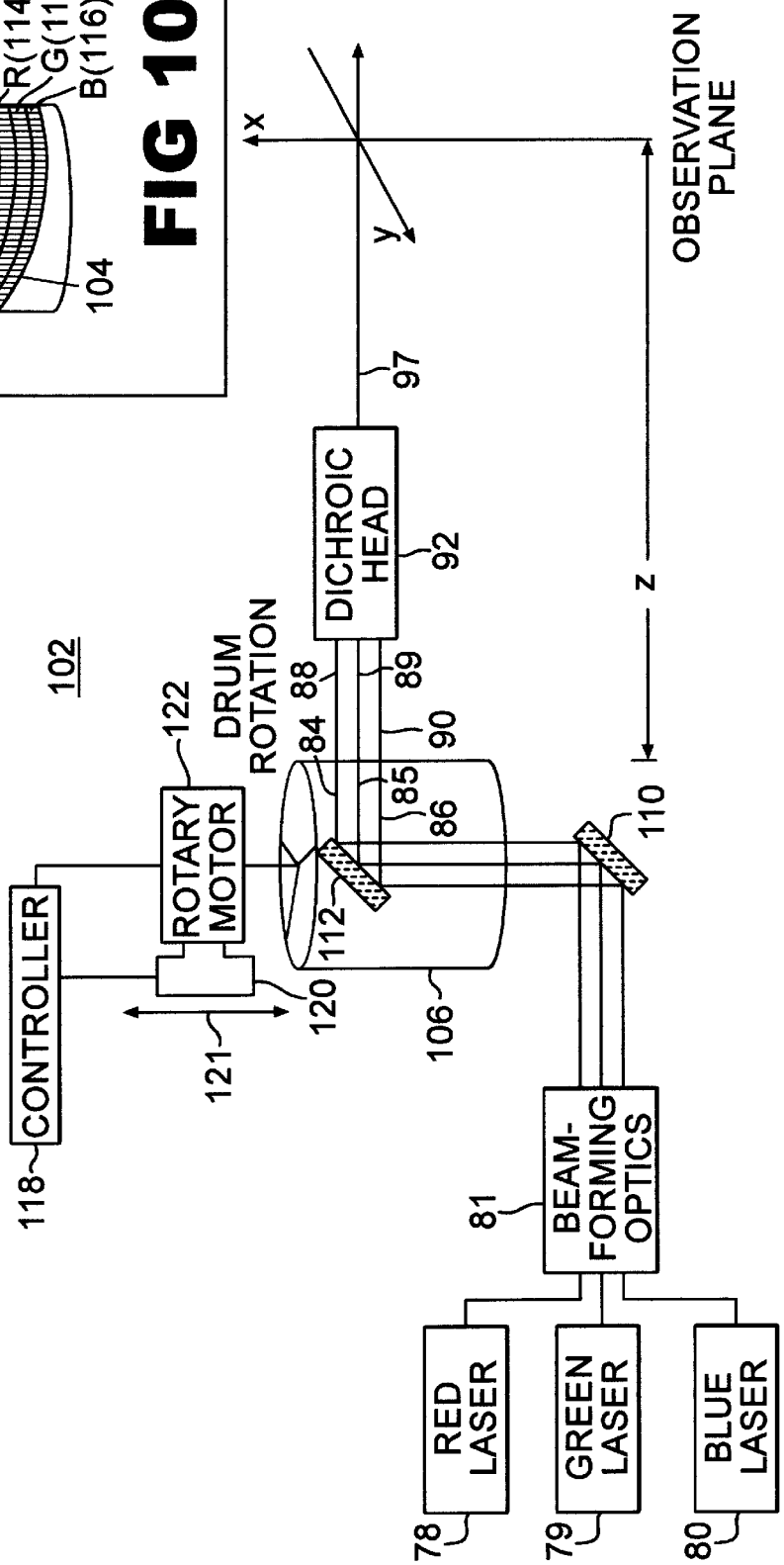
FIG. 10

SYSTEMS FOR PROJECTING IMAGES FROM DIFFRACTIVE PHASE PLATES

FIELD OF THE INVENTION

The present invention relates to systems for projecting images from diffractive phase plates, and particularly to, systems for projecting images encoded with different image information arranged along a path which have phase shifts aligned to reconstruct visible images in the Fraunhofer (or far-field) diffraction region. These systems are useful for displaying monochrome or color animation, and static color images.

BACKGROUND OF THE INVENTION

A diffractive phase plate (DPP) is a phase object that is capable of reconstructing an image in the Fraunhofer (of far-field) diffraction region of the DPP. Phase information is encoded into the DPP using a spatially varying surface-height or index of refraction distribution. Methods to encode information about the reconstructed image in the phase distribution of the DPP are described in academic literature, such as Stark et al., "Design of phase gratings by generalized projections," J. Opt. Soc. Am. A, Vol. 8, No. 3, March 1991, pp. 566–571, Duparréet al., "Investigation of computer-generated diffractive beam shapers for flattening of a single-modal $CO_2$ laser beams," Applied Optics, Vol. 34, No. 14, May 10, 1995, pp. 2489–2497, and Yoshikawa et al., "Phase optimization of a kinoform by simulated annealing," Applied Optics, Vol. 33, No. 5, Feb. 10, 1994, pp. 863–868.

DPPs differ from amplitude-modulated diffractive plates in that they are more efficient, i.e., a greater percentage of the incident light is directed into the reconstructed image, and DPPs may be replicated in high volume and at low cost. Other features of DPPs are that no additional image-forming optics are generally required between the DPP and the reconstructed image, and when the image reconstruction occurs in the Fraunhofer (or far-field) diffraction region, the reconstructed image is in focus at all distances in the diffraction region. Further, lateral magnification of a reconstructed image from a DPP is directly proportional to the distance between the DPP and the plane of observation.

Efficient image reconstructions with DPPs may be accomplished by shaping the surface-relief (or blaze) profile of the DPP, such as the projection onto constrained sets algorithm (POCS), as described Stark et al., supra. Furthermore, there are several methods DPP elements can be used to produce DPP replicas, including optical lithography, electron-beam lithography, and single-point laser pattern generation, examples of fabrication methods are described in: U.S. Pat. No. 4,846,552 by Veldkamp et al, issued Jul. 11, 1989; U.S. Pat. No. 5,148,319 to Gratix et. al. issued Sep. 15, 1992, and academic publications by Gale et al., "Fabrication of continuous-relief micro-optical elements by direct laser writing in photoresists," Opt. Eng. 33, pp. 3556–3566 (1994), and Faklis et al., "Continuous phase diffractive optics using laser pattern generation," SPIE Holography Tech. Group Newsletter, Vol. 2, July 1993.

Typically, the use of DPPs in projection systems have been limited to illuminating isolated DPPs with laser light to reconstruct images encoded on each DPP. The reconstructed images produced by such systems provide only static and monochromatic images.

In addition, holographic image projection systems have been proposed to provide two or three dimensional images from sequenced holograms, but have shown limited practicability and only use holograms. Examples of such holographic image projection system are shown in: U.S. Pat. No. 3,632,181 to Lee, issued Jan. 4, 1972; U.S. Pat. No. 3,625,585 to St. John, issued Dec. 12, 1971; U.S. Pat. No. 4,007,481 to St. John, issued Feb. 8, 1977; and U.S. Pat. No. 4,595,252 to Lorimer, issued Jun., 17, 1986.

Such holograms used in these projection systems are distinct from DPPs. A hologram is a recording of the interference pattern between two optical fields, an object beam and a reference beam. The resulting interference pattern is generally recorded using a volume-type recording material, such as a thick layer of photosensitized emulsion. Volume-type recording materials enable one to produce efficient (bright) image reconstructions through the use of Bragg effects within the recording volume. In contrast, in a DPP only object information is encoded as phase information. There is no reference beam, and therefore there is no interference pattern recorded between object and reference beams. Accordingly, a DPP is not a hologram. Further, holograms do not provide the advantageous features of DPPs stated earlier.

SUMMARY OF THE INVENTION

It is the principal object of the present invention to provide an improved system for projecting images having a group of diffractive phase plates in which when multiple phase plates are illuminated a composite image is formed by the coincident superposition of reconstructed images in the Fraunhofer (or far-field) diffraction region.

Another object of the present invention is to provide an improved system for projecting images in which monochomatic and color animation is provided by moving a group of multiple diffractive phase plates along a path relative to a light source illuminating the plates.

A further object of the present invention is to provide an improved system for projecting images in which static color images are provided by combining reconstructed images from diffractive phase plates representing different color channels.

Briefly described, the present invention embodies a system for projecting images encoded onto diffractive phase plates (DPPs). The system includes a group of diffractive phase plates each encoded with different image information which have phase shifts aligned to reconstruct visible images in a Fraunhofer (or far-field) diffraction region. The phase plate are arranged along a path. A light source illuminates the plates and provides, when multiple plates from the group are illuminated, a composite image representing image information encoded in the phase plates illuminated. This composite image is a superposition of reconstructed images from the phase plates illuminated in which the reconstructed image are coincident with each other in the composite image.

The light source, preferably a laser, produces a beam to illuminate an area along the path of the plates. Image information is contributed from each phase plate into the composite image in proportion to the overlap of the plates in this area.

The system may further include a mechanism for moving the plates along their path such that images projected from the system in the Fraunhofer (or far-field) diffraction region represent the composite image from successively different illuminated multiple plates or the reconstructed image from a single plate.

Images projected by the system may be monochromatic or color. For color imaging, each diffractive phase plates in the system represents a set of plates of different color channels.

For each color channel, the above mentioned light source represents a separate light source for illuminating the phase plates of each color channel to provide a composite image from such plates in each color channel. Optics may be provided for combining the composite images from multiple color channels, or for combining images reconstructed from each plate of a different color channel in a set.

One feature of the present invention is that the frame rate required to produce an animation sequence is reduced substantially compared to that produced by conventional imaging (or movie) systems, where the frame rate must be sufficiently high so has to produce flicker-free animation or imagery. In the case of DPP-generated images, each DPP may represent a different DPP frame and there is a smooth transition from one DPP frame to another irrespective of the frame rate, wherein the reconstructed image evolves continuously from one image to the other in proportion to the area of overlap of the given DPP frames with respect to an illumination beam. Accordingly, the number of frames to produce a repetitive-motion animation sequence is reduced compared to that produced by conventional imaging (or movie) systems.

Another feature of the present invention is that the reconstructed images of the composite images remain in focus and in registration, i.e., coincidence with each other, at any plane in the Fraunhofer diffraction region of the DPPs.

Yet another feature of the present invention is that by reconstructing images from DPPs in the Fraunhofer diffraction region the reconstructed composite image is invariant to the position of the DPPs relative to the illumination of the plates.

BRIEF DESCRIPTION OF THE DRAWINGS

The forgoing and other objects, features and advantages of the invention will become more readily apparent by reference to the following detailed description when considered in conjunction with the accompanying drawings, wherein:

FIG. 7(a) shows the drum of FIG. 7 in more detail;

FIG. 10 is a schematic diagram of the system of the present invention for generating color a animation sequences with DPPs arranged on a drum;

FIG. 10(a) shows the drum of FIG. 10 in more detail; and

DETAILED DESCRIPTION OF THE INVENTION

Figure 1:
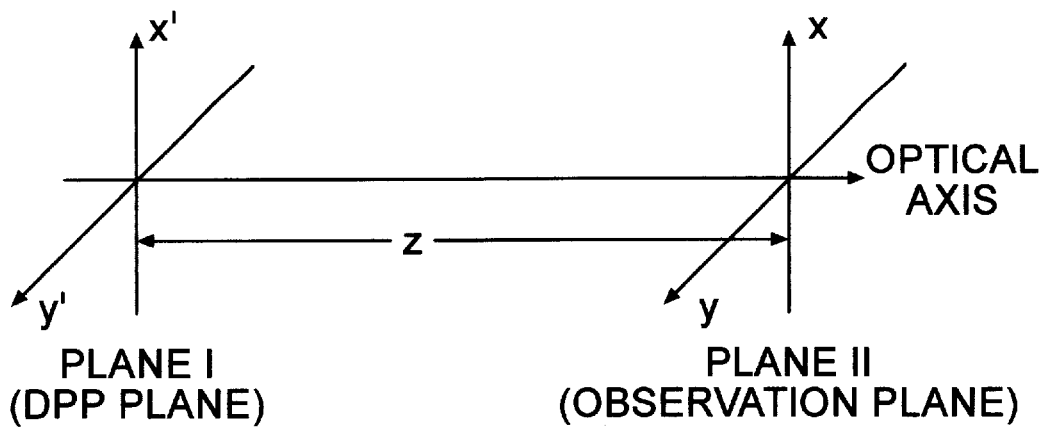
FIG. 1 is a schematic representation of an optical configuration defining the locations of the DPP (Plane I) and the reconstructed image (Plane II), located in the Fraunhofer (or far-field) diffraction region of the diffractive phase plate (DPP)
Figure 2:
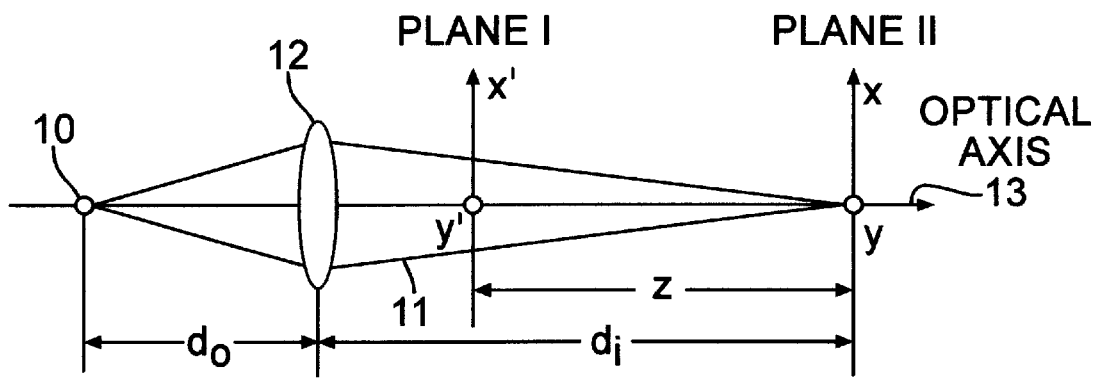
FIG. 2 shows an optical configuration whereby the Fraunhofer diffraction pattern located in plane II when an object, located in plane I, is illuminated by a converging beam of wavelength $\lambda$.
Figure 3:
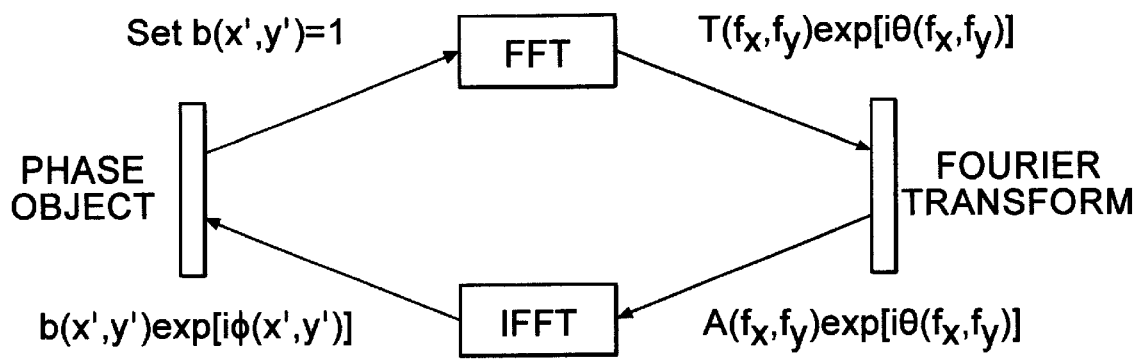
FIG. 3 is a block diagram of the projection-onto-constrained sets (POCS) algorithm for producing a DPP.

Referring to FIGS. 1–3, the generation of the diffractive phase plates (DPPs) used in the present invention will be described. The reconstructed images produced by DPPs are observed in the Fraunhofer (or far-field) diffraction regions. As shown in FIG. 1, the reconstructed image is to be observed in Plane II, which is located in Fraunhofer diffraction region of the DPP, located in Plane I. The Fraunhofer diffraction region represents a region of validity for an approximation solution to the Fresnel diffraction integral as described below.

Using the paraxial approximation, i.e., when the object and reconstructed images occupy spatial coordinates (x',y') and (x,y), respectively, such that each coordinate x', y', x, y<<z, the Fresnel diffraction integral, which describes the optical field distribution $\Psi_{II}(x,y)$ in the observation plane II in terms of the optical field distribution $\Psi_I(x',y')$. exiting plane I is given by $$\psi_{II}(x, y) = \frac{-ik}{2\pi z} e^{ik2F} \int\int \Psi_I(x', y') e^{\frac{+ik}{2z}(x^2+y^2)} e^{\frac{-ik}{2z}(xx'+yy')} dx'dy' \quad (1)$$

where $k=2\pi/\lambda$, $\lambda$ is the wavelength of the illumination, and z is the separation between plane I and plane II. Plane I represents the location of the DPP. Plane II denotes the plane in which the reconstructed image is observed.

The Fraunhofer diffraction region is defined as the region in which the quadratic phase term $\phi_F(x',y')=[(ik)/(2z)](x^2+y^2)$ is either negligible or canceled by a phase term in $\Psi_I(x',y')$. The phase term $\phi_F(x',y')$ is negligible when $$\phi_F(x',y')=[(ik)/(2z)](x^2+y^2)<<\pi, \quad (2)$$

which occurs when $$z>>(x^2+y^2)/\lambda. \quad (3)$$

Equation (3) is known as the "Fraunhofer (or far-field) condition."

In the Fraunhofer diffraction region, the optical field in the observation is given by $$\psi_{II}(x, y) = \frac{-ik}{2\pi z} e^{ik2F} \int\int \Psi_I(x', y') e^{\frac{-ik}{2z}(xx'+yy')} dx'dy' \quad (4)$$

Equation (4) is known as the Fraunhofer diffraction integral. Equation (4) provides that the optical field in plane II, i.e., the optical field of the reconstructed image, is proportional to the Fourier transform of the optical field exiting plane I, which contains the DPP. Furthermore, from Equation (4), we note that the optical field at a particular point in the reconstructed image is obtained by summing or integrating over the contributions from all points of the field exiting the DPP plane; hence, each point in the reconstructed image contains information from all points in the DPP plane.

As an example, consider the case when the incident field is limited in spatial extent by a circular aperture of radius A. Equation (3) then implies that the Fraunhofer diffraction region occurs when the separation between planes I and II is $$z >> A^2/\lambda. \tag{5}$$

Alternatively, Fraunhofer diffraction occurs when the optical field exiting plane I contains a quadratic phase term that is equal in magnitude but opposite in sign to $\phi(x',y') = [(ik)/(2z)](x^2+y^2)$. In the optical schematic of FIG. 2 this situation is shown, for example, when an object in plane I is illuminated by a converging beam 11 from point source 10. The distances $d_o$ and $d_i$ satisfy the imaging equation, $1/d_o + 1/d_i = 1/F$, where F is the focal length of a converging lens 12 located on an optical axis 13 between point source 10 and Plane I. For the configuration in FIG. 2, the optical field $\Psi_{II}(x,y)$ is represented by the Fraunhofer diffraction integral, Equation (4). In all cases considered below, the intensity pattern observed in plane II is proportional to the squared modulus of $\Psi_{II}(x',y')$, given in Equation (4).

Referring to FIG. 3, a block diagram of the projection-onto-constrained sets (POCS) algorithm is shown for shaping the surface-relief (or blaze) profile of each of the DPPs in the present invention. Other algorithms for shaping the surface-relief profile may also be used, such as geometrical ray-tracing, as described, for example, in Duparré et al., supra., and simulating annealing, as described, for example, in Yoshikawa et al., supra. Preferably, the POCS algorithm, such as shown in Stark et al., supra., is used for shaping the surface-relief (or blaze) profile of DPPs to encode image information having phase-shifts which will reconstruct the desired visible image in the Fraunhofer diffraction region. The POCS algorithm is briefly described below.

With the POCS algorithm, the phase of the optical field is used in the reconstruction plane as a degree of freedom. The square root of the image is taken to be reconstructed as the amplitude of the electric field that is to be formed in the diffraction region of the DPP and assigns a random value to phase of the electric field at each spatial point in the reconstructed image plane. The complex-valued (amplitude and phase) electric field in the reconstruction is inverse transformed, for example, using the fast-Fourier-transform algorithm, to obtain an estimate of the complex-valued field exiting the DPP plane I. In the DPP plane I the phase term is retained, but as in the case of the design of a DPP, the amplitude of the field exiting the DPP plane is set equal to one, thereby constraining the modulation of the exiting field to be pure phase modulation, i.e. a field capable of being produced by a DPP. After setting the amplitude of the electric field exiting the DPP plane I equal to one, the electric field is transformed back to the image reconstruction plane, where amplitude of the complex-valued electric field is replaced with the square root of the image to be reconstructed and the phase of said electric field is retained. This procedure is then iterated until the phase modulation of the electric field exiting the DPP plane I produces an acceptable reconstructed image. Typically, ten to fifteen iterations of this algorithm are sufficient to produce an acceptable reconstructed image. Although some images require fewer or more iterations to produce the desired image.

Specifically, with the POCS algorithm, the square root of the desired intensity pattern for the reconstructed image, i.e., the desired Fourier modulus, is specified and denoted by $A(f_x,f_y)$, where $f_x$ and $f_y$ denote spatial frequency variables: $f_x = x/(\lambda z)$ and $F_y = y/(\lambda z)$. The phase, $\theta(f_x,f_y)$, of the reconstructed optical field is used as a degree of freedom in the design, since it does not affect the intensity pattern of the reconstructed image. A random number generator is used to initialize the values of $\theta(f_x,f_y)$. The complex field, $A(f_x,f_y) \exp[i\theta(f_x,f_y)]$, in the reconstruction plane, plane II of FIG. 1, is inverse Fourier transformed using a standard Fast Fourier Transform (FFT) algorithm, which produces a complex-valued field, $b(x',y')\exp[i\phi(x',y')]$, at the DPP plane, plane I of FIG. 1. The amplitude of the field, $b(x',y')$, is set equal to one and the phase term, $\phi(x',y')$, is retained, thereby representing the optical field, $\exp[i\phi(x',y')]$, exiting a DPP. The field exiting the DPP is then Fourier transformed using the FFT algorithm to obtain the complex optical field, $T(f_x,f_y) \exp[i\theta(f_x,f_y)])$, of the reconstructed image, which is produced by the DPP. The modulus of the field, $T(f_x,f_y)$, is replaced by the desired Fourier modulus $A(f_x,f_y)$, while retaining the new values for the phase term, $\theta(f_x,f_y)$. The algorithm is repeated until an acceptable Fourier modulus, $T(f_x,f_y)$, is produced by the DPP.

Returning to the expression for the optical field of the reconstructed image, Equation (4), since $\Psi_{II}(x,y)$ is proportional to the Fourier transform of $\Psi_I(x',y')$, the well known theorems of Fourier analysis may be utilized, specifically the shift theorem, as described for example in Appendix B of Goodman, J. W., *Introduction to Fourier Optics* (McGraw-Hill, New York, 1968). This shift theorem states: lets f(x',y') represent a function in object space and $F(f_x,f_y)$ represent its Fourier transform. If f(x',y') is shifted by distances a and b, the Fourier transform of f(x'-a,y'-b) is $F\{f(x'-a,y'-b)\} = \exp[if_x a + if_y b]F(f_x,f_y)$.

Applying this theorem to Equation (4), the effect of a shift in location of the DPP is to multiply the optical field, $\Psi_{II}(x,y)$, of the reconstructed image by a phase term. However, since only the intensity pattern is of interest in the reconstructed image, which is proportional to the squared modulus of the optical field, the shift of the DPP has no effect on the intensity pattern of the reconstructed image. As a result, the reconstructed image intensity pattern is unaffected by a shift of the DPP within the illumination beam, i.e., it remains registered as the DPP is shifted or translated through the illumination beam.

Figure 4A:
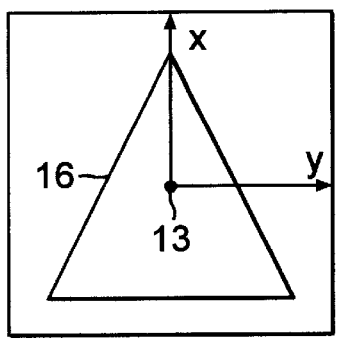
FIGS. 4(a), 4(b) and 4(c) are schematic representation of a monochromatic reconstructed image formed by a first DPP, a second DPP, and the composite reconstructed image formed by simultaneously illuminating the first and second DPPs, respectively.
Figure 4B:
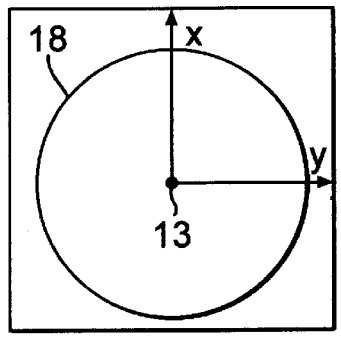
Figure 4C:
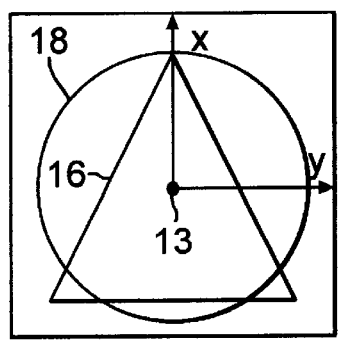

Referring to FIG. 4, the shift-invariant properties of the reconstructed image from the DPP in the system and the coincidence of the reconstructed images from multiple DPPs are shown. Arrows in the figures represents a common set of x,y coordinates. FIG. 4(*a*) depicts the reconstructed image from DPP #1 of a triangle 16 in which the point in the center represents the location of optical axis 13 of the system. FIG. 4(*b*) depicts the reconstructed image from DPP #2 of a circular ring 18 in which the point in the center also represents the location of optical axis 13 of the system. FIG. 4(*c*) depicts a composite reconstructed image when DPP #1 and DPP #2, which are situated side-by-side, such as in an animation sequence, are illuminated simultaneously. Both reconstructed images, triangle 16 and ring 18, appear simultaneously, and both are centered about the optical axis of the system, despite the shift in spatial position of their respective DPPs relative to illumination. Accordingly, in the composite reconstructed image the reconstructed image from each DPP #1 and #2 are coincident with each other in fixed spatial relationship to optical axis 13.

If each DPP #1 and #2 were entirely illuminated by the illumination beam, each image will be equally expressed in the composite reconstructed image. However, as will be shown in the systems of the present invention, such DPP #1 and DPP #2 represent examples of different encoded images arranged along a path to provide two adjacent DPP frames in a succession of DPP frames in which each frame overlaps an area of illumination provided by the same beam. For example, one-quarter of the first DPP frame and three-quarters of the second DPP frame overlaps the illumination beam. In this case the composite image will be consist of the reconstructed images from each of the DPP frames. The reconstructed images from each DPP frame will be coincident or registered with respect to each other, i.e., no observed shift is spatial position of the two reconstructed images in the composite image. Further in this example, the resulting intensity pattern of the composite image will consist of two parts the one-quarter of the intensity produced from the first DPP frame and three-quarters of the intensity produced from the second DPP frame. The two DPP frames intensity to the composite image in proportion to their overlap in the area of illumination of the two DPP frames. Accordingly, moving the two DPP frame relative to a fixed illumination beam changes the intensity of their reconstructed images in the composite image.

Figure 5:
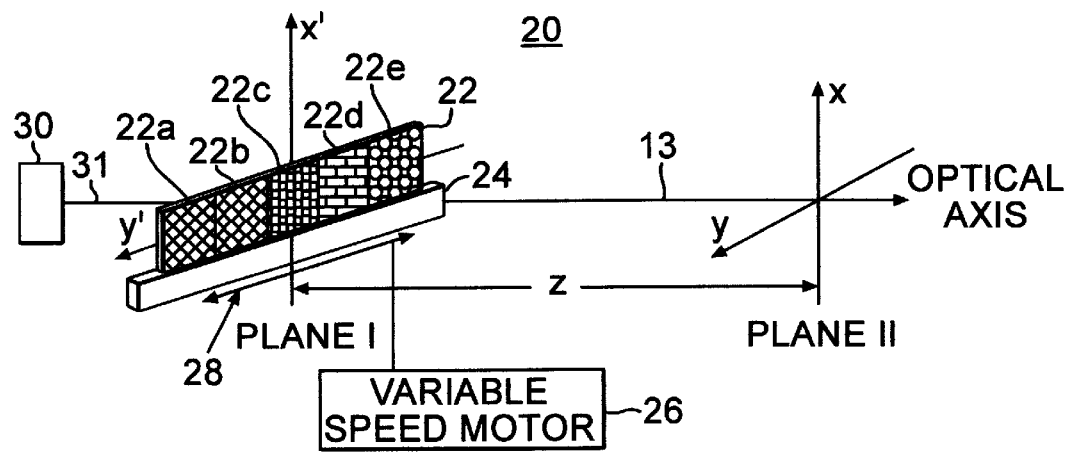
FIG. 5 is a schematic diagram of the system of the present invention in which the DPPs are linearly arranged.

Referring to FIG. 5, a system 20 of the present invention is shown in which multiple DPPs (or DPP frames) 22 are linearly arranged In the x', y' plane. Five DPPs 22 are shown for purpose of illustration, more or less may be used. DPPs 22 are labeled 22a, 22b, 22c, 22d, and 22e. Each of DPPs 22 may be encoded with image (phase shift) information to represent a series of monochromatic frames of an animated sequence. DPPs may represent a single substrate encoded with DPPs 22a–e, or separate substrates which abut each other. A linear translation stage 24 provides repetitive oscillating linear motion to DPP frames 22 along a path represented by the y' axis responsive to a variable speed motor 26. Bidirectional arrow 28 represents the motion of stage 24. An illumination beam 31 from light source 30, such as a laser, defines optical axis 13. Illumination beam 31 may be sized to illuminate several successive DPP frames, a single frame, or only part of a single frame, but preferably, illumination beam 31 is approximately the same size as a single frame of DPP 22. Light source 30 may include optics for shaping illumination beam 31 to the desired size. Further, the size of illumination beam 31 is an additional degree of freedom in the construction of the optical system that may be used to achieve or enhance animation effects.

In system 20, the repetitive oscillating linear motion applied to DPP frames 22 by motor 26 produces an illumination sequence of the DPP frames 22a–e by illumination beam 31. The order of the illumination sequence may be DPP 22a, 22b, 22c, 22d, 22e, 22d, 22c, 22b, 22a, 22b, and so on, where each DPP is illuminated for approximately the same duration, or the sequence may be DPP 22a, 22b, 22c, 22d, 22e, 22e, 22d, 22c, 22b, 22a, 22a, 22b and so on, in which the dwell time of motor 26 on the end DPPs 22a and 22e causes the end DPPs to be illuminated for a longer duration than the other DPPs 22b–d. The reconstructed images from the DPP frames 22 will occur in the Fraunhofer diffraction region denoted in plane II. Changes in the distance z between plane I and plane II will effect only magnification, but not the focus of the images so long as plane II is in the Fraunhofer diffraction region of the DPPs 22.

During the illumination sequence, multiple DPP frames 22 (in this case two) can overlap illumination beam 31 causing composite images described in connection with FIG. 4 to occur. As each DPP frame 22 enters and exits illumination beam 31, the reconstructed image from the DPP frame first increases in intensity as it contributes to a composite image formed with the prior DPP frame until it solely occupy beam 31 at which time only its reconstructed image is projected, and then the reconstructed image from the DPP frame decreases in intensity as it contributes to a composite image formed with the next DPP frame. Thus, animation encoded on the DPP frames 22 smoothly transitions into each other. The smoothness of the transitions is independent of the rate the frames are moved.

Figure 6:
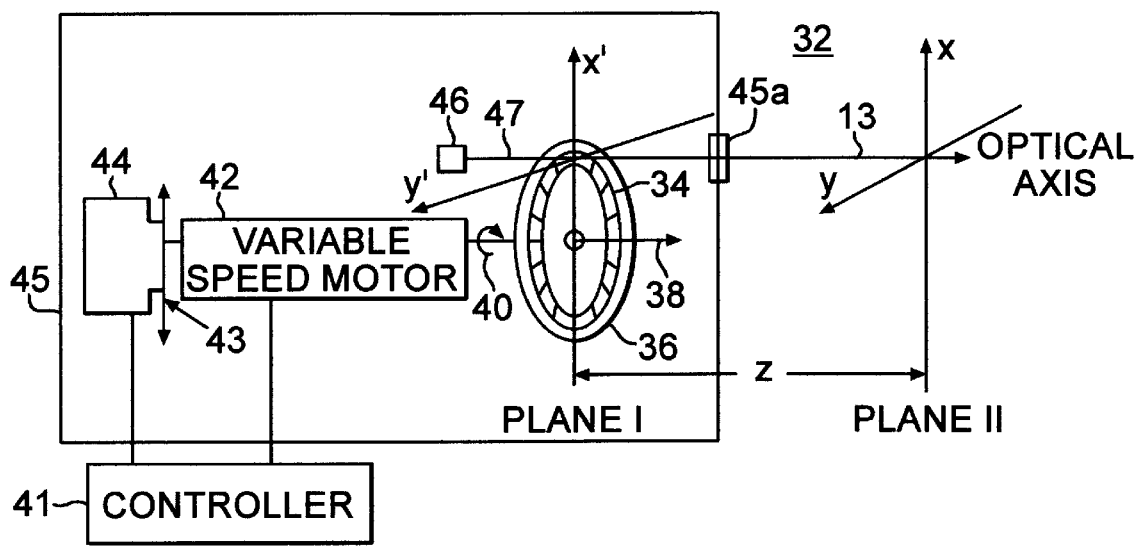
FIG. 6 is a schematic diagram of the system of the present invention in which the DPPs are circularly arranged, such as on a rotating disk.

Referring to FIG. 6, a system 32 of the present invention is shown in which multiple DPPs (or DPP frames) 34 are arranged in the x', y' plane on disk 36, such as a compact disk (CD). Similar to system 20, DPP frames 34 may be encoded to each reconstruct a different sequential frame of monochrome animation in plane II. DPP frames 34 are arranged in a circular path at different radial positions on disk 36. Other frame path formats may also be used, such as a spiral path on disk 36. One or more successive DPPs 34 are illuminated by an illumination beam 47 from light source 46 in which optical axis 13 is defined by illumination beam 47. Similar to system 20, illumination beam 47 may be shaped to a desired size for DPPs 34.

Both a translation stage 44 and a variable speed motor 42 are used to move disk 36 such that each of DPP frames 34 may be positioned at a plane containing optical axis 13 defined by illumination beam 47. To project encoded images from DPP frames 34 located at different radii on disk 36, disk 36 can be translated by linear translation stage 44 to move the disk 36 bidirectionally along a linear direction (shown by arrow 43) parallel to axis x'. Motor 42 is provided to rotate disk 36 about a rotational axis 38 in the direction of arrow 40. Preferably, axis of rotation 38 of disk 36 is parallel to optical axis 13 such that motor 42 can position disk 36 to access different DPPs located along a circular ring on disk 36 and disk 36 is translated by stage 44 along axis x' to access different DPPs located at different radii circular rings, or disk 36 is translated by translation stage 44 in synchronous motion with the rotation of disk 36 to position DPP frames 34 when arranged in a spiral path on disk 36.

To eliminate a spatial shift in the reconstructed image, optical axis 13 defined by an illumination beam 47 may be fixed, or optical axis 13 may be shifted in position when DPPs 34 are similar shifted such that the spatial relationship between illumination beam 47 and DPPs 34 is not effected by the shift. For example, the motor 42, stage 42, disk 36, and light source 46 may be located in a projector head 45, as shown in FIG. 6, such that movement of projector head 45 shifts the position of optical axis 13, but not the relative position of light source 46 (producing beam 47) and DPPs 34 to each other. An aperture or window 45a may be provided in projected head 45 along optical axis 13 to provide exiting of reconstructed images from DPPs 34. Such shifts in the position of the optical axis 13 produces image translation of the reconstructed image, allowing the reconstructed image to shift position relative to an observer of the image. These shifts, although separate from movement of disk 36 by motor 42 or stage 44 to access different DPPs, may be synchronized with the animation produced from such movement.

A controller 41 in system 32 may send signals to stage 44 and motor 42 to control the position of disk 36 relative to illumination beam 47, both laterally along axis x', via stage 44, and rotationally along axis 38, via motor 42. Controller 41 may thus align the path of DPP frames 34 with the illumination beam 47, and control the movement of DPP frames 34 along the path relative to illumination beam 47 to successively positioned such frames relative to illumination beam 47. Controller 41 may, for example, be a programmed microprocessor, or switches controlling stage 44 and motor 42 operation.

As discussed above, disk 36, motor 42, stage 44 and light source 46 may be located in projector head 45. Controller 41 may also be within projector head 45, but preferably is external of projected head 45, as shown in FIG. 6. Window 45a may include optical elements for removing artifacts in the reconstructed image, such elements will be later described in connection with FIG. 11.

Figure 7:
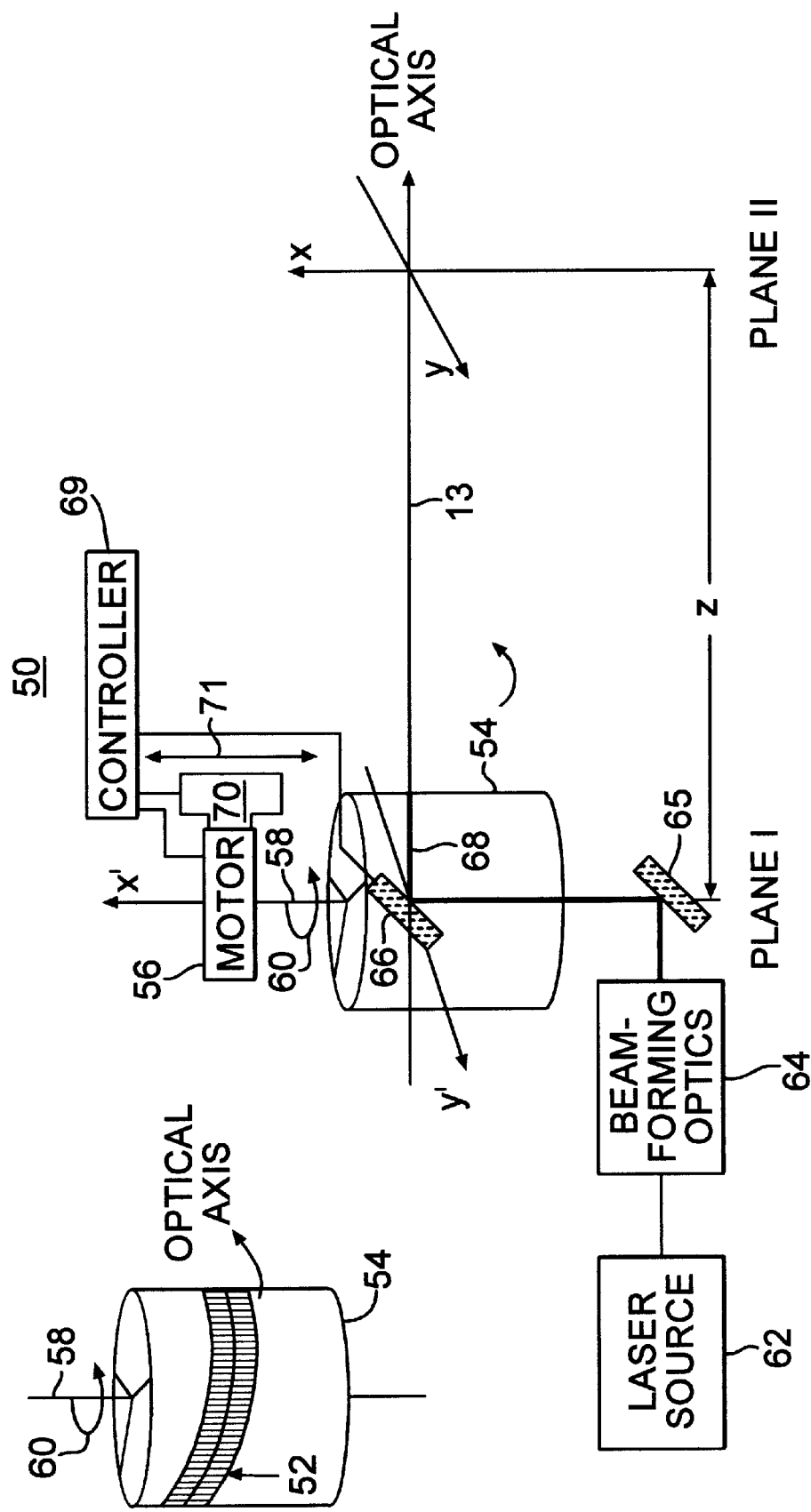
FIG. 7 is a schematic diagram of the system of the present invention in which the DPPs are arranged in a spiral on a rotating drum.

Referring to FIG. 7, a system 50 of the present invention is shown in which multiple DPPs (or DPP frames) 52 are arranged on a drum or cylinder 54. FIG. 7(a) shows drum 54 with DPP frames 52 in more detail. Similar to systems 20 and 32, the DPP frames 34 may be encoded to each reconstruct a different sequential frame of monochrome animation in plane II. DPP frames 52 are arranged in a circular or spiral path on drum 54, which is rotated by motor 56, where axis x' defines the axis of rotation 58 in the direction of arrow 60. Light (laser) source 62 produces a laser beam which passes through beam forming optics 64 to provide illumination beam 68 of desired size. Beam 68 is reflected by mirrors 65 and 66 along optical axis 13 along the inside of drum 54 to illuminate DPP frames arranged on drum 54.

Drum 54 is translated linearly along the direction of the cylinder axis (axis x') by translation stage 70 (in direction of bidirectional arrow 71) and rotationally via motor 56, so that different illuminated DPP frames 52 are positioned in a plane containing optical axis 13 defined by illumination beam 68. A controller 69 in system 50 sends signals to stage 70 and motor 56 to control position of the DPP frames relative to illumination beam 68, and to thereby control movement of the drum 54 such that successive DPP frames are positioned relative to beam 68. Preferably, drum 54 is translated step-wise by stage 70 along the x' axis to access different rows of DPPs 54 located in different circular paths along the circumference of drum 54, or drum 54 is continuously translated by stage 70 in synchronous motion with the rotation by drum 54 when DPP frames 54 are arranged in a spiral path.

To eliminate a spatial shift in the reconstructed image, optical axis 13 defined by an illumination beam 68 may remain fixed, or optical axis 13 may be shifted in position when DPPs 52 are similar shifted such that the spatial relationship between illumination beam 68 and DPPs 52 is not effected by the shift. Optionally, to facilitate shifting of optical axis 13, mirror 66 may include a motor for rotating mirror 66 about axis 58 to move illumination beam 68 reflected by mirror 66, thereby shifting the position of optical axis 14 defined by beam 68. Such rotation by mirror 66 would be controlled by controller 69 and synchronized with rotation of drum 54 by motor 56 (and motion of stage 70 if DPP path is spiral) to maintain the spatial relationship of DPPs 52 due to any shift in the optical axis 13. Such shifts in the position of optical axis 13 produces image translation of the reconstructed image. Although the shift in optical axis is separate from the motion of drum 54 by motor 56 to select different DPPs, it may be synchronized with changes in the position of illumination beam 68 to different DPPs 52 by motor 56 and stage 70.

A The present invention also provides for projecting static and animated color images from DPPs. In reference to Equation (4), static and animated color images can be generated using three DPP frames together with three illumination wavelength (e.g., red=$\lambda_R$, green=$\lambda_G$, and blue=$\lambda_B$) provided by one or more illumination sources. Examples of wavelengths for red, green and blue are 647 nm, 514 nm and 458 nm, respectively, which may be produced by a laser, such an argon-krypton ion laser. DPPs for the red, green and blue channels will be denoted by $f_R(x',y')$, $f_G(x',y')$, $f_B(x',y')$, respectively, together with the associated reconstructed optical fields that are proportional to $F_R[x/(\lambda_R z), y/(\lambda_R z)]$, $F_G[x/(\lambda_R z), y/(\lambda_R z)]$, $F_B[x/(\lambda_R z), y/(\lambda_R z)]$. These expressions indicate that the magnification of the transform (or in our case the reconstructed image) is directly proportional to illumination wavelength.

The similarity theorem of Fourier analysis, which is described, for example, in Appendix B of Goodman, supra., provides the physical mechanism for creating color image reconstructions in which the magnification of the reconstructed image is the same for each illumination wavelength. The similarity theorem is stated as follows: let $f(x',y')$ represent a function in object space and $F(f_x,f_y)$ represent its Fourier transform. If $f(x',y')$ is magnified by the factors $M_x$ and $M_y$ in the x and y directions, respectively, the Fourier transform of $f(x'/M_x, y'/M_y)$ is $F\{f(x/M_x, y/M_y)\}=F(M_x f_x, M_y f_y)=F[M_x x/(\lambda z), M_y y/(\lambda z)]$.

Therefore, it follows that if each DPP is scaled (or magnified) by $M_x=M_y=\lambda/\lambda_o$, where $\lambda$ denotes the wavelength of the illumination channel and $\lambda_o$ is a design wavelength, the similarity theorem implies that the magnification of the reconstructed image will be same for each illumination wavelength. This provides the desirable result when the color channels of a reconstructed image are registered or coincident in a given plane in the Fraunhofer region, they are also automatically registered at all other planes in the Fraunhofer region, i.e., the colors of the reconstructed image remains in focus and registered everywhere in the Fraunhofer diffraction region.

Figure 8:
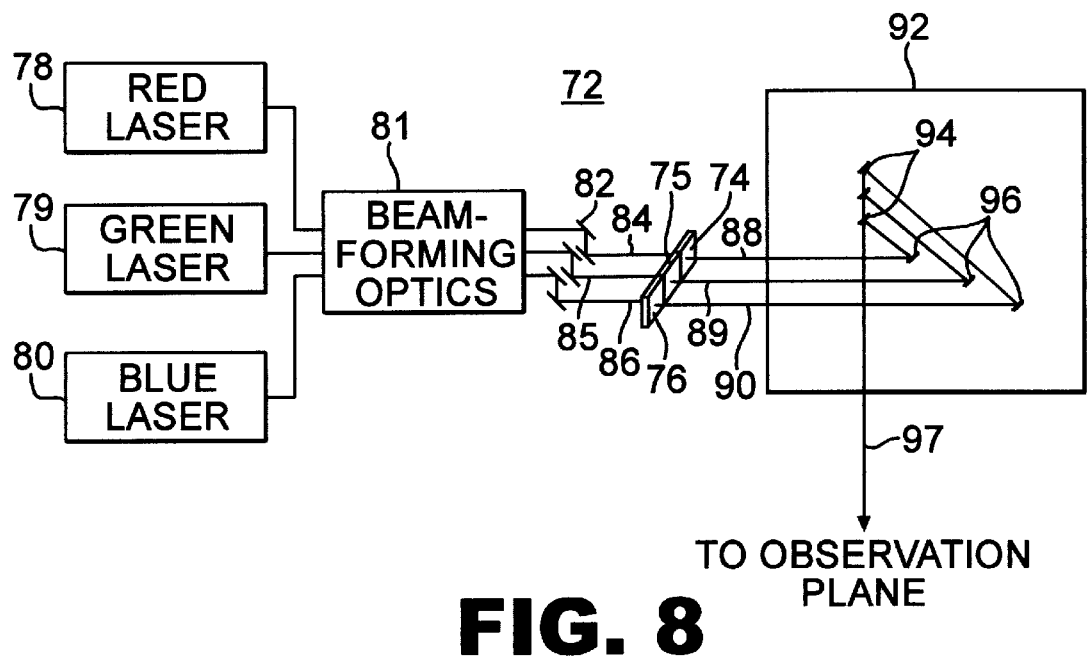
FIG. 8 is a schematic diagram of the system of the present invention for generating static multi-color images.

Referring to FIG. 8, a system 72 is shown for projecting static color composite images. The image (phase shift) information for a color image is encoded on three DPPs (or DPP frames) 74, 75, and 76, where each DPP encodes image information for the color image in a different color channel, such as red, green and blue. Three laser sources 78, 79, and 80, respectively, each produces an illumination beam of a wavelength for reconstructing image from the image information encoded on phase plates 74, 75, and 76, respectively. DPP frames 74–76 define a set of DPPs which are simultaneously illuminated by their respective lasers. In each color channel, beam-forming optics 81 are used to shape (or collimate) beams produced by lasers 78–80 into illumination beams 84, 86, and 85, respectively. Beam-forming optics 81 also provide the appropriate beam size and illumination wavefront such that beams 84–86 each may approximately fill DPP frames 74–76, respectively. Relay mirrors 82 may be used to align beams 84–86 with their respective DPP frame 74–76. The projected images 88–90 from DPP frames 74–76, respectively, i.e., in each color channel, are magnified in accordance with the Fourier similarity theorem described above. The optical axes of image projections 88, 89 and 90 in each color channel from DPP frame 74, 75, and 76, respectively, are made collinear by a beam-combining system 92, commonly referred to as a dichroic head. System 92 includes dichroic beamsplitters 94 which combine the images 88, 89 and 90 which are reflected by mirrors 96. The combined composite image from system 92 is reconstructed as a full color image in an observation plane in the Fraunhofer diffraction region. The reconstructed color image remains in focus and each color separation remains registered (or coincident) with respect to the others at all planes in the Fraunhofer diffraction region. By inserting different sets of DPPs 74–76, different static color image may be produced by system 72.

Figure 9:
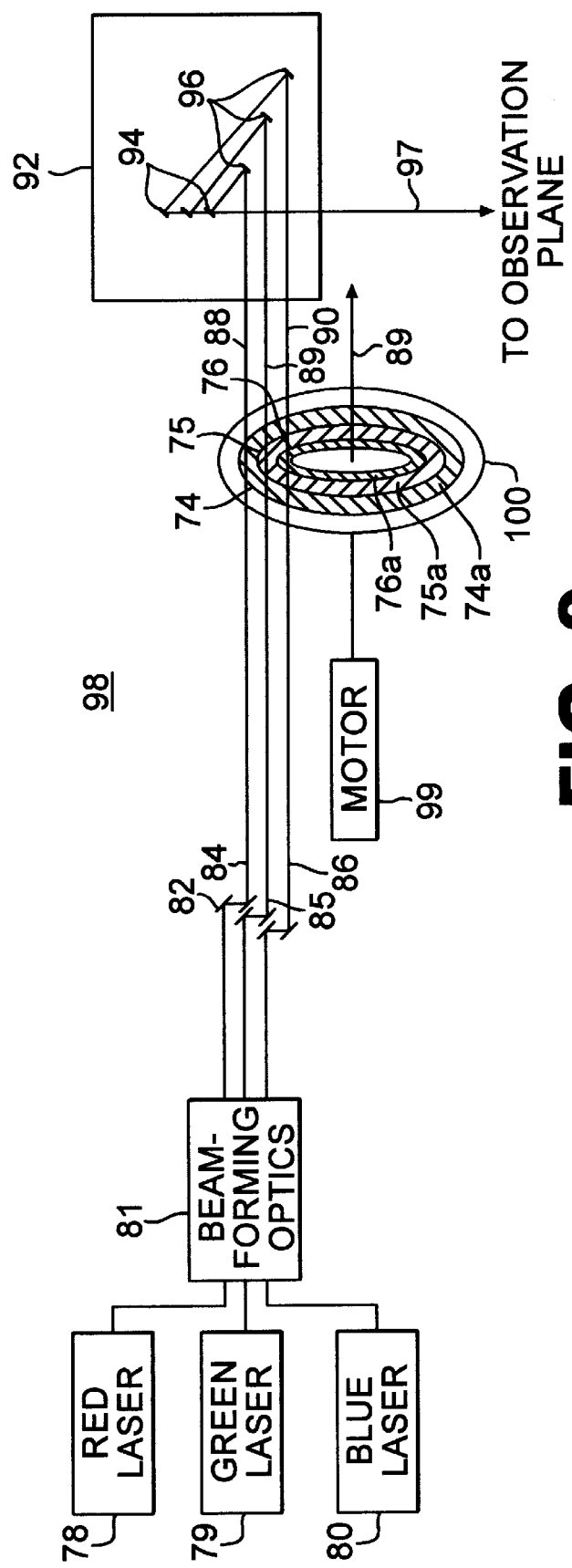
FIG. 9 is a schematic diagram of the system of the present invention for generating color animation sequences with DPPs arranged on a disk.

Referring to FIG. 9, a system 98 is shown for producing color animation sequences. System 98 includes the same components of system 72, expect for a disk 100 having DPPs 74a, 75a, and 76a in three color channels, and a motor 99 which rotates disk 100 along rotational axis 89. DPPs 74–76 of FIG. 8 represent in FIG. 9 one of multiple sets of DPPs in each of the color channels 74a–76a (red, green, and blue) on disk 100. Each set of DPPs 74–76 is encoded to produce projected images 88–90 which when combined by system 92 provides a single color image in the Fraunhofer diffraction region, as in system 72. Each color channel of DPPs 74a–76a represents a separate circular path on disk 100. Responsive to the rotation of disk 100, when multiple sets of DPPs 74–76 simultaneous receive portions of illumination beams 84–86, respectively, the projected images 88–90 define composite images for their respective color channel, as shown in FIG. 4. Each composite image represents projected images from DPPs from different illuminated sets, but of the same color channel. System 92 combines the composite images for each color channel to produce a color composite image in the observation plane. To produce color animation, motor 99 rotates disk 100 along axis 89 such that successive sets of DPPs 74–76 are positioned in a plane containing the optical axes defined by illumination beam 84–86, respectively. Optionally, a linear translation stage and controller may provided in system 98 similar to linear translation stage 44 and controller 41 of FIG. 6, to access color channels of DPP sets located at different radii on disk 100.

Referring to FIG. 10, a system 102 is shown for generating color animation sequences using three color channels (red, green, and blue) with a sequence of DPP frames 104 arranged in a circular or spiral path on a rotating drum 106. FIG. 10(a) shows DPP frames 104 on drum 106 in more detail. FIG. 10 represents a combination of system 50 of FIG. 7 and system 72 of FIG. 8, in which for each DPP frame 52 (FIG. 7) represents a set of three DPP frames 74, 75 and 76 (FIG. 8) of each color channel (R,G,B) on drum 106. Similar to FIG. 8, individual laser sources 78–80 provide red, green and blue wavelength beams to beam forming optics 81 to provide illumination beams 84–86, however beams 84–86 are reflected by mirrors 110 and 112 to illuminate one or more sets of DPP frames 104 arranged on separate color channels or tracts 114, 115, and 116 on drum 106. Color channels 114–116 are similar to color channels 74a–76a of FIG. 8, except channels 114–116 are arranged on drum 106 along either circular or spiral paths. Similar to FIG. 8, beam combining system 92 combines projected images 88–90 from DPPs 104 for each color channel into a single color image 97, a color reconstructed image in the observation plane (plane II in FIG. 1). When multiple sets of DPP frames simultaneously receive portion of their respective illumination beams, projected images 88–90 define composite images in each color channel, as shown in FIG. 4.

System 102 further includes a controller 118, a linear translation stage 120 and a rotary motor 122. which are similar to the controller 69, linear translation stage 70 and motor 56 of FIG. 7 to move drum 106 such that successive sets of DPPs along color channels 114–116 are positioned in a plane containing the optical axes defined by illumination beam 84–86, respectively. Linear translation stage 120 moves drum 106 bidirectionally along its x' axis (as shown by bidirectional arrow 122). Synchronization of the different color channels is automatically achieved in both systems 102 and 98 by their color channels being located on the same media, such as drum 106, disk 100, or a linear group of DPPs similar to DPPs 22 (FIG. 5) where each DPP represents a set of DPPs in each color channel.

Alternatively, to provide either static or animated color image, the three DPPs 74–76 shown in FIG. 8 may each be replaced with a programmable phase-type spatial light modulators (SLM), such as liquid-crystal SLMs or digital mirror devices. The specific phase values for each DPP is impressed onto a phase-type SLM through a digital interface connected to a computer. In this embodiment the DPP in each color channel is magnified in accordance with the Fourier similarity theorem described above. In the Fraunhofer diffraction region, a full-color reconstructed image is observed. The reconstructed color image remains in focus and each color separation remains registered with respect to the others at all planes in the Fraunhofer diffraction region. Using SLMs for each color channel in FIG. 8, a programmable color laser projection system is provided that is capable of producing both static and animated color reconstructed images. Synchronization of the projection of the different color channels for animation sequences requires that the frame rate is sufficiently high to avoid flicker in the reconstructed images.

An additional feature of the present invention is that in the DPPs of systems 20, 32 and 50 (FIGS. 5–7) are also capable of a producing gray-level reconstructed images, since DPPs may be encoded with phase shifts representing gray scale information, i.e., multiple levels of illumination in their reconstructed images. Further, the DPPs of systems 72, 98, and 102 (FIGS. 8–10) may be encoded with gray scale information for their respective color channel, i.e., multiple levels of illumination of the reconstructed images for a color channel (such as red, green, or blue). This is advantageous in displaying color images, since matching colors in a color image requires mixing of the three colors in different intensities, and also the control of the intensity of each color at each point in the color reconstructed image.

In systems 72, 98, and 102 (FIGS. 8–10) their respective laser sources are at wavelengths chosen in accordance with the color-gamut requirements for the particular display, i.e., to provide the scaling or magnification in accordance with the similarity theorem described earlier. It is also possible to use multiple laser wavelengths from a single laser source, rather than multiple laser sources as shown in systems 72, 98 and 100.

The light source described in systems 20, 32, 50, 72, 98 and 102 may be either high or low-power lasers and other spatially coherent sources, for example, laser diodes, helium-neon lasers, argon-ion and krypton lasers, and light-emitting diodes. Systems 20, 50, 72, 98, and 102 may be located in a projector head similar to projector head 45 shown in FIG. 6. Systems 72, 98 and 102 may provide fixed optical axes defined by their illumination beams 84–86 or allow positional shifts of such optical axes, similar to that described for systems 22, 32 and 55 for the single illumination beam case. Shifting the position of the optical axes with the same relative shift of the DPPs, results is translation of the static or animated color images.

Figure 11:
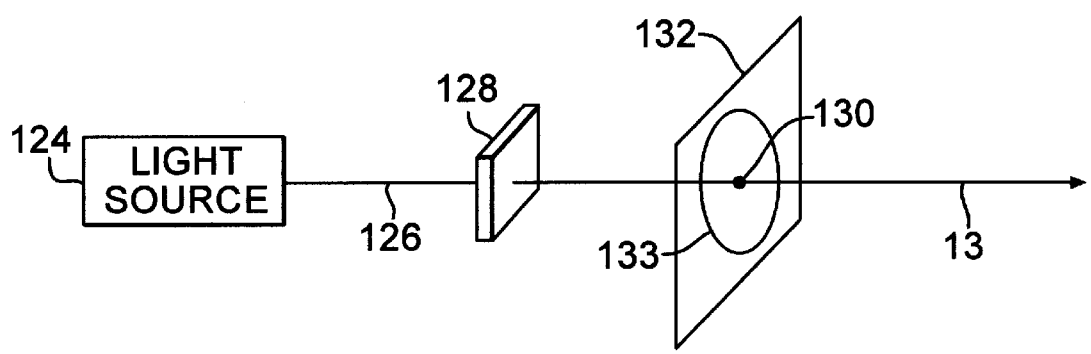
FIG. 11 is a schematic diagram of a mechanism which may be used in the systems of FIGS. 5–10 for eliminating zero-order or higher order diffraction.

The DPPs used in these system may operate in either transmission or in reflection. Although no imaging optics is generally required between DPP and viewing plane II, such as a screen, optical elements could be use to provide selective visual effects. For example, DPP artifacts, may be eliminated using the optical configuration shown in FIG. 11. In FIG. 11, a light source 124 which produces an illumination beam 126 to illuminate DPP 128 may represent any light source, illumination beam and illuminated DPP in the above described systems. To eliminate the DPP artifact produced by zero-order (undiffracted) light in the center of the reconstructed image, a blocking stop 130 may be placed along optical axis 13 defined by illumination beam 126. For example, blocking stop 130 may be a small opaque structure, or a diffuser or microlens which spreads the undiffracted light at a large angle. Higher-order diffractive light may be eliminated using block or screen 132 having an aperture 133 located along the optical axis 13. Although blocking stop 130 and blocking aperture 132 are shown located at the same plane, they may be at different planes along optical axis 13. Blocking stop 130 and aperture 132 may be located in systems 72, 98 or 102 (FIGS. 8–10) after each of the projected images 88–90, or along the optical axis of the combined color image 97. One advantage of using the block stop 130 in above described systems is that if light sources are not operating within their narrow spectral wavelength range designed for the particular DPPs they illuminate, stop 130 would block undiffracted light which otherwise may be formed at the center of projected images. This reduces the manufacturing tolerances in fabricating DPPs, and also allows the same DPPs to be illuminated by different color light if desired.

In the above described systems, preferably a single-point laser pattern generator is used to fabricate continuous-blaze diffractive master elements for the DPPs in the systems. In this method a laser beam, typically from a helium-cadmium or argon-ion laser, is focused to a small spot. This spot is used to expose a thin-layer of a photopolymer. As the focused laser beam is translated across the surfaces, the intensity of the beam is varied so that after development the surface-relief profile of the photopolymer layer produces the phase modulation needed for either the DPP master or replica to produce the desired reconstructed image in the diffraction field of the DPP. Other methods for fabricating continuous-blaze surfaces for a DPP master element may also be used, such as E-beam lithography, while binary multiple mask/etch approach can fabricate a stair-case-blaze profile. Continuous-blaze profiles for DPPs are preferred since they provide higher diffraction efficiency. Further, several methods can be used for replicating the fabricated DPP master elements, such as using UV-cured photopolymer, compression molding, or by using reactive-ion etching to etch the continuous-relief surface profile directly into a substrate material.

From the foregoing description, it will be apparent that there has been provided improved systems for projecting images from diffractive phase plates. Variations and modifications in the herein described systems in accordance with invention will undoubtedly suggest themselves to those skilled in the art. Accordingly, the foregoing description should be taken as illustrative and not in a limiting sense.

What is claimed is:

1. A system for projecting images encoded onto diffractive phase plates comprising:
    a group of non-holographic diffractive phase plates each encoded with different image information arranged along a path which have phase shifts aligned to reconstruct visible images in a Fraunhofer diffraction region;
    a light source which illuminates one or more of said plates and capable of illuminating a plurality of said plates from said group to provide a composite projected image representing image information encoded in said plurality of phase plates; and
    motor driven means for moving said plates relative to said light source.

2. The system according to claim 1 wherein said composite projected image is a superposition of projected images from said plurality of phase plates in which said projected images are coincident with each other in said composite image.

3. The system according to claim 2 wherein said light source produces an illumination beam and said plurality of phase plates are at different positions relative to said beam.

4. The system according to claim 1 wherein said light source produces an illumination beam projected to an area along said path in which the intensity of the reconstructed images from said plurality of phase plates in said composite projected image is in proportion to the overlap of each of said plurality of phase plates in said area.

5. The system according to claim 1 wherein said moving means moves said group of plate plates along said path.

6. The system according to claim 5 wherein said moving means further comprises means for moving said group of plates to illuminate one or more of said plates with said light source.

7. The system according to claim 5 wherein said moving means further comprises means for moving said group of plates in which the plates from said group in said plurality of plates change to provide different composite projected images.

8. The system according to claim 1 wherein said path is one of linear, circular, and spiral.

9. The system according to claim 1 wherein the encoded image information of said group of plates represents successive frames of animation.

10. The system according to claim 1 wherein said source is a laser and said illumination is a laser beam.

11. The system according to claim 1 wherein said diffractive phase plates are associated with at least one color channel and said light source provides illumination in accordance with said color channel.

12. The system according to claim 1 wherein said system is adapted for a projector head to produce reconstructed images from said diffractive phase plates.

13. The system according to claim 1 wherein said light source produces a beam for illuminating one or more said phase plates, said beam defines an optical axis in which said reconstructed images coincide with said optical axis, and shifts in the position of said optical axis results in translation of said reconstructed images in said Fraunhofer diffraction region.

14. The system according to claim 1 wherein said light source produces a beam for illuminating one or more said phase plates, said beam defines an optical axis in which said reconstructed images coincide with said optical axis, said system further comprises a block having an aperture for eliminating diffracted light of high-orders from said phase plates.

15. The system according to claim 1 wherein said images from said diffractive phase plates are locatable in focus at projected locations anywhere in the Fraunhofer diffraction region onto an observation plane.

16. The system according to claim 1 wherein said moving means moves the group of plates along a path with respect to the light source in which a projected image from each of the plates smoothly transition into a projected image of the next one of the plates along the path through said composite projected image independent of the rate at which the group of plates is moved along the path.

17. A system for projecting images encoded onto diffractive phase plates comprising:
    a group of non-holographic diffractive phase plates each encoded with different image information arranged along a path which have phase shifts aligned to reconstruct visible images in a Fraunhofer diffraction region; and
    a light source which illuminates one or more of said plates and capable of illuminating a plurality of said plates from said group to provide a composite projected image representing image information encoded in said plurality of phase plates, wherein each of said plates in said group represents a set of diffractive phase plates of different color channels, said light source represents at least one light source for illuminating plates for each of said color channels at a wavelength in accordance with said color channel, and for each of said color channels, said plurality of plates represents a plurality of plates of one of said color channels from different sets illuminated by the light source for said one color channel to provide a composite image in said one color channel.

18. The system according to claim 17 wherein each said set of diffractive phase plates provides the same magnification in all planes in the Fraunhofer diffraction region in accordance with the wavelengths illuminating said plates.

19. The system according to claim 17 further comprising optics for combining the composite images from each said color channels to produce a color composite image.

20. The system according to claim 17 wherein said source in each of said color channels is a laser producing a laser beam at a different narrow spectrum of wavelengths.

21. A system for projecting images encoded onto diffractive phase plates comprising:
   a group of non-holographic diffractive phase plates each encoded with different image information arranged along a path which have phase shifts aligned to reconstruct visible images in a Fraunhofer diffraction region; and
   a light source which illuminates one or more of said plates and capable of illuminating a plurality of said plates from said group to provide a composite projected image representing image information encoded in said plurality of phase plates, wherein said light source produces a beam for illuminating one or more said phase plates, said beam defines an optical axis in which said reconstructed images coincide with said optical axis, said system further comprising a stop centered along said optical axis to block undiffracted light from said phase plates.

22. A method for projecting images comprising the steps of:
   providing plates of different encoded images which have non-holographic phase shifts aligned to reconstruct visible images in a Fraunhofer diffraction region; and
   illuminating said plates individually or together, whereby said plates illuminated together provide a composite projected image representing the encoded images, wherein each said plate represents a set of plates in different color channels, and said illuminating step further comprises illuminating plates individually or together in each color channel in accordance with a wavelength for the color channel, whereby when said plates are illuminated together in each color channel a composite image is displayed for representing the encoded images.

23. The method according to claim 22 further comprising the step of projecting images from said plates being illuminated, whereby when said plates are illuminated together said projected images are coincident with each other in said composite projected image.

24. The method according to claim 22 further comprising the step of moving said plate while one or more of said plates are illuminated.

25. The method according to claim 22 wherein the different encoded image of said plates represent successive frames of animation.

26. The method according to claim 22 wherein each said set of diffractive phase plates provides the same magnification in all planes in the Fraunhofer diffraction region in accordance with the wavelengths illuminating said plates.

27. The method according to claim 22 further comprising the step of combining the composite images in each color channel to form a color composite image.

28. The method according to claim 22 further comprising the step of locating the projected images from said diffractive phase plates anywhere in the Fraunhofer diffraction region into an observation plane.

29. A system for projecting color images encoded onto diffractive phase plates comprising:
   a set of diffractive phase plates each encoded with different image information which have phase shifts aligned to reconstruct a visible color image in a Fraunhofer diffraction region;
   at least one light source for illuminating each phase plate of said set with a different wavelength of light; and
   means for combining projected images from each said phase plate in said set to reconstruct said color image in the Fraunhofer diffraction region.

30. The system according to claim 29 further comprising means for shaping the illumination from each said light source to approximately fill each phase plate in said set.

31. The system according to claim 29 wherein said set of diffractive phase plates provides the same magnification in any plane in the Fraunhofer diffraction.

32. The system according to claim 29 wherein each plate in said set of diffractive phase plates is provided by a spatial light modulator characterizing image information as phase shifts.

33. A system for projecting images encoded onto diffractive phase plates comprising:
   diffractive phase plates each encoded with different image information and have phase shifts aligned to reconstruct visible images in a Fraunhofer diffraction region;
   means for arranging the plates along a path;
   a light source which produces an illumination beam incident upon an area of said path; and
   motor driven means for moving said plates relative to said illumination beam to project images from said plates in the Fraunhofer diffraction region in which as said plates move relative to said illumination beam multiple adjacent ones of said plates can receive light from the illumination beam and provide multiple projected images which overlap and are registered with each other in the Fraunhofer diffraction region.

34. A method for projecting images encoded onto diffractive phase plates comprising the steps of:
   providing plates of different encoded images which have non-holographic phase shifts aligned to reconstruct visible images in a Fraunhofer diffraction region;
   illuminating said plates individually or together, whereby said plates illuminated together provide a composite projected image representing the encoded images; and
   moving said plates with the aid of a motor to enable different plates to be illuminated.

* * * * *